Patented Jan. 27, 1942

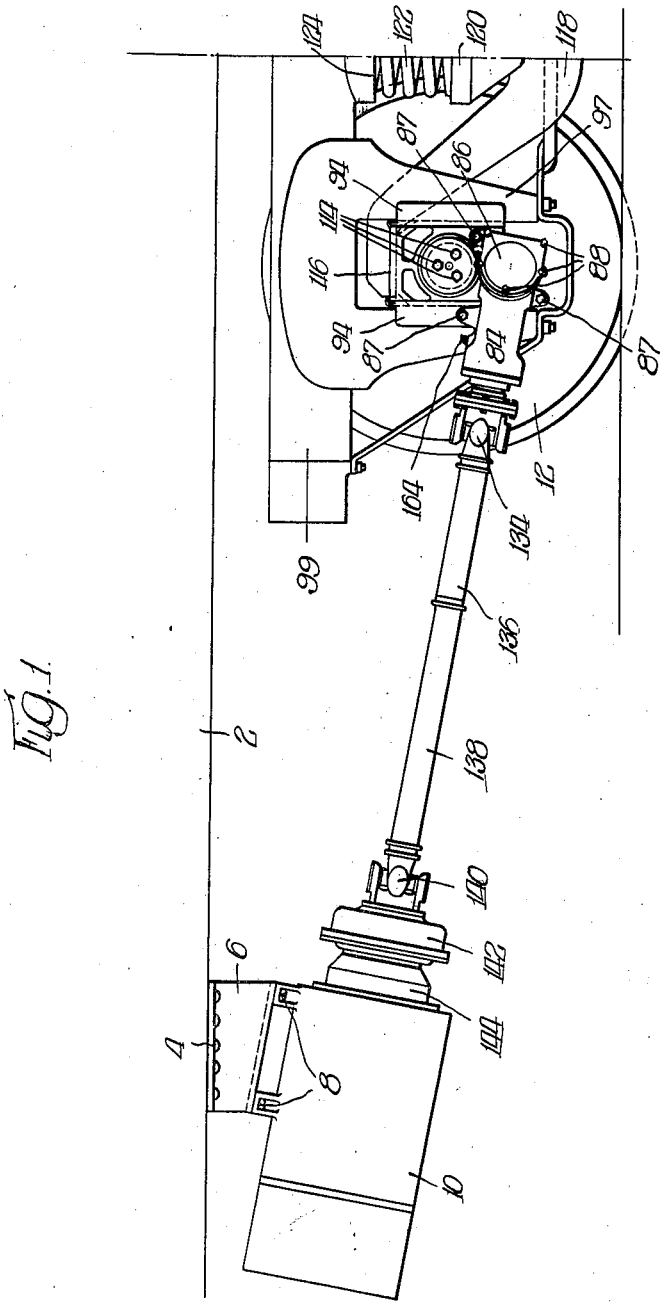

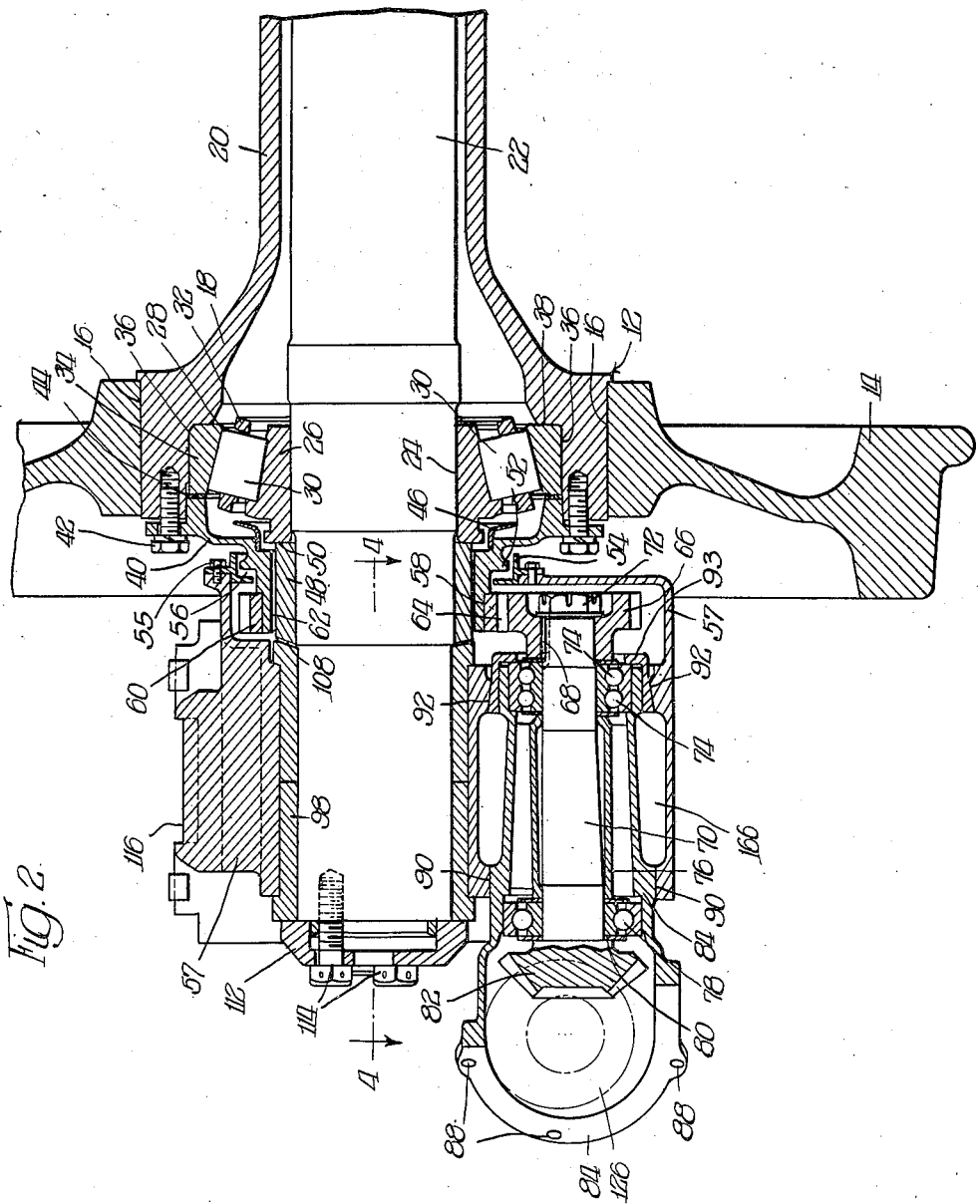

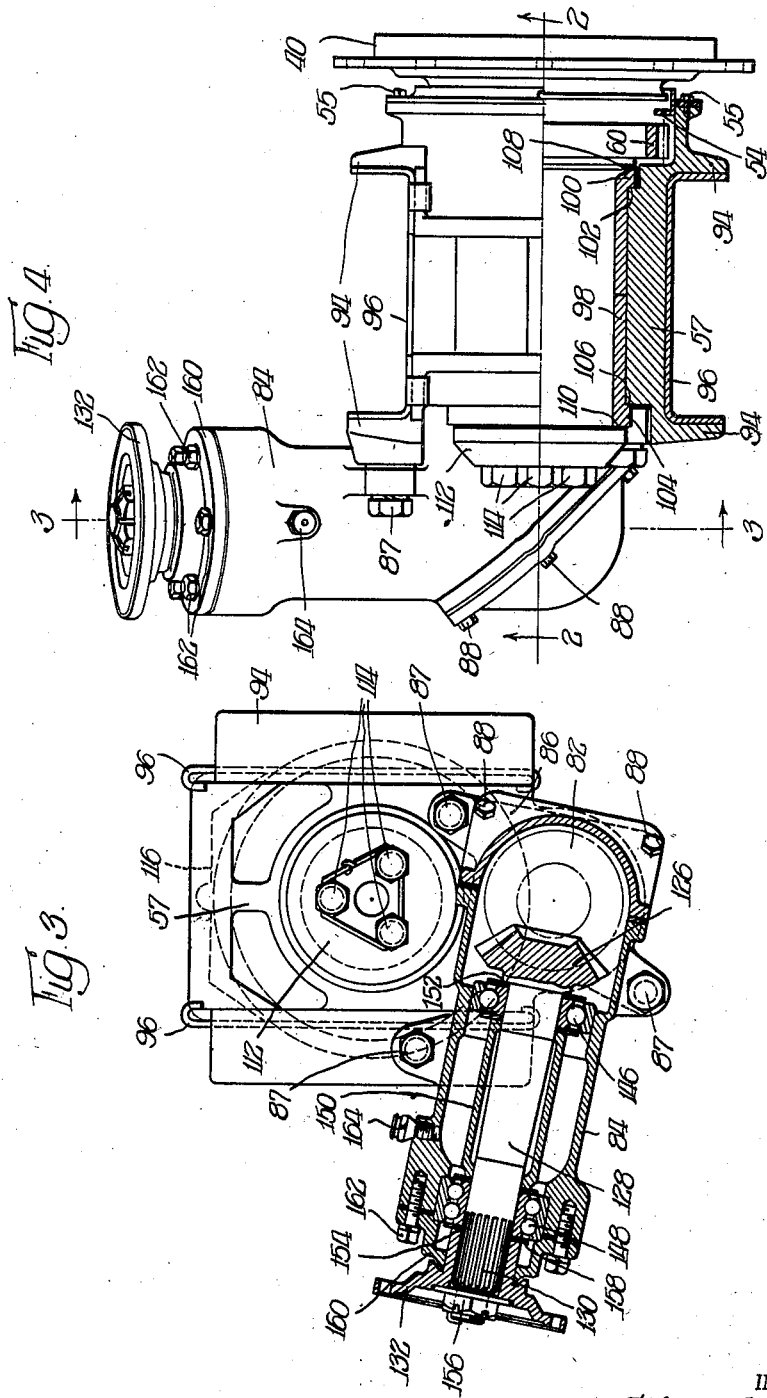

2,271,027

UNITED STATES PATENT OFFICE 2,271,027

GENERATOR DRIVE

Alfred H. Oelkers, Chicago, Ill., assignor to American Steel Foundries, Chicago, Ill., a corporation of New Jersey Application August 14, 1939, Serial No. 289,946

26 Claims. (Cl. 105—96.1)

My invention relates to railway vehicles and more particularly to an arrangement for transmitting driving means from a wheel and axle assembly of a moving vehicle to electric power generating means supported on a car body.

Under present conditions with a great portion of passenger equipment being operated under air cooled conditions it is apparent that a greatly increased drain has been placed upon the equipment carried by the train to produce electrical energy for the various purposes required.

A more definite object of my invention is to provide a generator drive as such devices are commonly called for a well-known type of wheel and axle assembly of anti-friction form.

Another object of my invention is to mount generating driving means on a wheel and axle assembly which comprises an outer normally rotating axle and an inner normally non-rotating axle.

My invention comprehends a novel means of connecting generating driving means to an outer rotating axle in conjunction with journal means normally connected to the non-rotating axle of such an assembly.

A yet different object of my invention is to design a generator drive for connection to an anti-friction type of wheel and axle assembly wherein the drive may be connected to the closure plate serving in part as a housing for the anti-friction bearing.

A further object of my invention is to mount a generator driving mechanism on the outer side of a truck and rail in such manner that it may be inspected with the greatest convenience and minimum hazard.

A still further object of my invention is to provide a generator driving mechanism which may be readily replaced without removing the wheel and axle assembly from the truck and with minimum delay.

Describing in detail the embodiments set forth in the drawings,

Figure 1 is a fragmentary side elevation of a railway car embodying my invention;

Figure 2 is a sectional view therethrough taken substantially in the vertical plane bisecting the wheel and axle assembly as indicated by the line 2—2 of Figure 4;

Figure 3 is a view in elevation taken from the left as seen in Figure 2, partly in section, the section being taken substantially in the longitudinal vertical plane indicated by the line 3—3 of Figure 4; and Figure 4 is a plan view of the structure adjacent the journal box, certain parts being shown in section, the sections being taken along the horizontal plane indicated by the line 4—4 of Figure 2.

2 represents a fragmentary portion of a car body supporting as at 4 the brackets 6 serving as a means of connection as at 8, 8 for the generator 10 which is hung therefrom along a diagonal axis. 12 indicates generally an anti-friction wheel and axle assembly of a well-known form comprising the wheel 14 having a press fit as at 16 on the bell-like end 18 of the outer axle 20. The outer axle 20 is sleeved around the inner axle 22 which supports as at 24 as by a press fit the cone 26 of the anti-friction bearing generally indicated 28, said bearing comprising a series of rollers 30, 30 held in spaced relationship by the cage 32, said rollers being received within the cup race 34 which has a press fit as at 36 within the bell-like end 18 with the shoulder at 38. Fitted over the bearing cavity is the closure plate 40 of cylindrical form at its inboard end, said inboard end being received within the outboard end of the bell-like portion 18 and secured thereagainst by machine bolts or studs 42 in tight abutment as at 44 against the outboard edge of the cup 34. Sleeved within the closure plate 40 is the oil deflector or baffle 46. The anti-friction bearing 28 is retained in position by the shrink ring 48 which is pressed on the inner axle 22 in abutment as at 50 with the cone 26 of the anti-friction bearing.

The closure plate 40 is afforded an annular collar at 52 forming with the ring 54 a labyrinthin passage as at 56 serving to retain lubricating material. The ring 54 is secured as at 55 by a series of stud nuts to the journal box 57. The housing 40 is extended outboard of the annular flange 52 to form a means of support as at 58 for the gear ring or collar 60 which is press fitted thereon. The outboard end of the closure plate is afforded clearance as at 62 from the shrink collar 48.

Meshing with the gear collar 60 as at 64 is the pinion gear 66 which is locked as at 68 to the gear shaft 70 and secured thereon by the nut 72 threaded on the end of the shaft 70. The pinion gear 66 abuts one side of the anti-friction bearing 74 and the opposite side of said bearing is in abutment with the sleeve 76 mounted around the shaft 70, the opposite end of the sleeve 76 abuts the bearing 78 which in turn rests against the shoulder 80 of the bevel gear 82 integrally formed on the end of the shaft 70. The anti-friction bearings 74 and 78 are mounted within the gear housing 84 and afford a means of rotation therewithin of the gear shaft 70 with the pinion gear 66 and the bevel gear 82 fixedly mounted thereon.

The housing 84 is formed as a single casting secured by stud bolts as at 87, 87 to the journal box casting 57, with the bevel closure plate 86 secured as at 88, 88, said closure plate being of sufficient size to afford access to the gears for removal or application as necessary. That portion of the gear housing 84 which encloses the gear shaft 70 is slidably fitted within the journal box 57 having cylindrical fit therewith as at 90 adjacent the outboard edges of the box and having a tapered seat as at 92 on the closure cap 93 adjacent the inboard edge of said box. Thus the housing 84 with the gear assembled therein may be placed within the opening at the end of the journal box in order to mesh the gear wheel 60 with the pinion gear 66 at the time of assembly.

The journal box 57 is afforded the usual pedestal jaws 94 at opposite sides thereof with the usual channel liners 96, 96 at opposite sides thereof, thus affording connection to the pedestal 97 forming a portion of the car truck generally designated 99. The journal opening in the box is afforded the sleeve or liner 98 of anti-friction metal press fitted within said journal opening. The inboard half of said sleeve has an annular collar as at 100 (Fig. 4) abutting the shoulder 102 integrally formed on the journal box and, likewise, the outboard half of the sleeve has an annular collar 104 having abutment as at 106 with the similar shoulder formed at the outboard edge of the box, thus the sleeve 98 affords an abutment as at 108 against the shrink collar 48 and, likewise, an abutment as at 110 against the securing ring 112 which is mounted on the end of the inner or stationary axle 22 as by means of the stud bolts 114. This arrangement limits to the desired clearance, as shown at 108 (Figure 2), the lateral motion afforded between the journal box which acts as a carrier for the gear train and the rotating wheel and axle assembly on which is mounted the gear ring 60. This clearance may occur at either or both ends of the sleeve 98 depending on the lateral movement of the box 57 within which the sleeve is press fitted as already described. In case of failure of the bearing 28 temporary emergency frictional rotation is thus permitted between the inner axle 22 and the sleeve 98. The top of the journal box 57 is afforded a seat as at 116 for the equalizer 118 in the usual manner, said equalizer supporting the spring seat 120 upon which may rest the spring 122 upon the opposite end of which may be supported as at 124 in well-known manner a frame member of the car truck 99.

The bevel gear 82 meshes with the bevel gear 126 integrally formed on the end of the gear shaft 128, the opposite end of which has a splined connection as at 130 to the shaft connection 132, said shaft connection comprising the universal joint as at 134. The sleeve members 136 and 138 afford some flexibility in the length of said shaft. The opposite end of the shaft has also a universal connection as at 140 with the flexible union 142 which is connected to the armature 144 of the generator 10.

The gear shaft 128 is mounted within the housing 84 on the bearings 146 and 148 at opposite ends thereof, said bearings being spaced by the sleeve 150. The bearing 146 has abutment as at 152 against a shoulder on the bevel gear 126 and the bearing 148 at the opposite end of the shaft 128 is retained tightly against the sleeve 150 by abutment as at 154 with the end of the shaft connection 132, said shaft connection 132 being secured on the end of the shaft 128 as by means of the threaded nut 156. Adjustment is afforded for the shaft 128 by shim means as at 158. The end of the housing 84 adjacent the shaft connection 132 has the closure plate 160 secured to said housing as at 162, 162. The lubricant access is afforded to the housing 84 by fittings as at 164.

The wheel and axle unit 12 may be assembled in the usual manner comprising the normally non-rotating inner axle 22, the outer rotating axle 20, the anti-friction bearing 28, the shrink ring 48 and the closure plate 40. Thereafter, the ring 54 may be slipped on the end of the closure plate and then the gear collar 60 press fitted upon the outboard end of the closure plate 40. The journal box may then be mounted in the usual manner, having previously been fitted with the two-piece anti-friction sleeve 98 affording lateral motion control. The box may then be secured in place by the retaining ring 112. With the parts assembled the wheel and axle unit is ready for application of the gear assembly into the opening or cavity 166 provided therefor at the bottom of the box below the journal opening therein.

It may be noted that the gear collar or gear ring 60 is mounted concentrically with the wheel 14, being in the modification shown afforded a convenient connection thereto by means of the closure plate 40. The journal box 57 serves as a carrier for the gear train and therefore its movement relative to the gear ring 60 must be strictly limited. My novel arrangement affords a convenient method of control of the lateral movement of the journal box as already described, thus insuring correct mesh between the pinion gear 66 and the gear ring 60.

The gear train may be completely dismantled without disturbing other parts of the wheel and axle assembly and the wheel and axle unit may be operated without the gear train in the usual manner.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a railway vehicle, a car body, a supporting truck including a wheel and axle unit, a generator hung from said body, said unit comprising an outer normally rotating axle and an inner normally non-rotating axle, a journal box supported from said non-rotating axle, a gear ring fixed to rotate with said rotating axle, a train of gears supported from said journal box connecting said gear ring with said generator, said gear train comprising a shaft housed in said journal box, a gear wheel thereon in mesh with said gear ring, a shaft angularly disposed with respect to said first mentioned shaft, and an adjustable connection between said generator and said angularly disposed shaft.

2. In a railway vehicle, a car body, a supporting truck including a wheel and axle unit, a generator hung from said body, said unit comprising an outer normally rotating axle and an inner normally non-rotating axle, a journal box supported from said non-rotating axle, a gear ring fixed to rotate with said rotating axle, a train of gears supported from said journal box connecting said gear ring with said generator, said gear train comprising a shaft housed in said journal box, a gear wheel thereon in mesh with said gear ring, a shaft angularly disposed with respect to said first mentioned gear shaft, and a universal connection between said angularly disposed shaft and said generator.

3. In a vehicle, a car body, a generator, a supporting truck comprising a wheel and axle unit with an outer normally rotating axle and an inner normally non-rotating axle having journal ends, a journal box supported on one of said journal ends, and driving means for said generator comprising a gear ring supported from said outer axle, a train of gears supported from said journal box and connected between said gear ring and said generator, said gear train comprising a gear shaft housed in said journal box beneath the adjacent journal end, a gear shaft angularly disposed with respect to said first shaft outwardly of said box, and a universal connection between said generator and said last mentioned shaft.

4. In a vehicle, a car body, a generator, a supporting truck comprising a wheel and axle unit with an outer normally rotating axle and an inner normally non-rotating axle having journal ends, a journal box supported on one of said journal ends, and driving means for said generator comprising a gear ring supported from said outer axle, a train of gears supported from said journal box and connected between said gear ring and said generator, said gear train comprising a gear shaft housed in said journal box and parallel with the adjacent journal end, a gear shaft angularly disposed with respect to said first shaft outwardly of said box, and a shaft of adjustable length connected between said generator and said outer gear shaft.

5. In a vehicle, a supported body, a generator hung from said body, a supporting truck including an anti-friction wheel and axle assembly with an outer normally rotating axle and an inner normally non-rotating axle having a journal end, a journal box supported on said journal end, a gear ring mounted to rotate with said outer axle within said box, and a gear train connected between said generator and said gear ring, said gear train comprising angularly disposed gear shafts supported from said journal box with gear means meshing with said gear ring, one of said shafts being parallel with said journal end, and a flexible connection between one of said shafts and said generator.

6. In a vehicle, a supported body, a generator hung from said body, a supporting truck including an antifriction wheel and axle assembly with an outer normally rotating axle and an inner normally non-rotating axle having a journal end, a journal box supported on said journal end, a sleeve fitted in said box around said journal end to afford rotation thereof in emergency, a gear ring mounted to rotate with said outer axle and a gear train connected between said generator and said gear ring, said gear train comprising angularly disposed gear shafts supported from said journal box with gear means meshing with said gear ring, and a universal connection between one of said shafts and said generator.

7. In a vehicle, a supported body, a generator hung from said body, a supporting truck including an anti-friction wheel and axle assembly with an outer normally rotating axle and an inner normally non-rotating axle having a journal end, a journal box supported on said journal end, a gear ring within said journal box secured to said outer axle for rotation therewith, and a gear train connected between said generator and said gear ring, said gear train comprising angularly disposed gear shafts supported from said journal box, one of said shafts extending beneath said journal end and having gear means meshing with said gear ring, and means including a sleeve on said inner axle for limiting relative lateral motion between said journal box and said outer axle.

8. In a railway vehicle, a car body, a supporting truck comprising a wheel and axle unit, a generator supported from said body, said unit comprising an outer rotating axle, wheels fixed thereon, an inner normally non-rotating axle having a journal end projecting therefrom, a sleeve fitted in said box around said journal end to afford rotation thereof in emergency, a gear ring supported from said outer axle, a journal box supported on said journal end, a gear train mounted on said journal box with a gear wheel meshing with said gear ring at the inboard portion of said journal box, and gear shafts connecting said gear wheel and said generator.

9. In a railway vehicle, a car body, a supporting truck including a wheel and axle unit, a generator hung from said body, said unit comprising an outer normally rotating axle and an inner normally nonrotating axle having a journal end, a journal box supported from said nonrotating axle, a gear ring fixed to rotate with said rotating axle, a train of gears supported from said journal box connecting said gear ring with said generator, means on said journal box enclosing said gear ring and housing certain gears disposed along and beneath said journal end, and means including a sleeve on said nonrotating axle and fitted within said journal box for limiting the relative lateral movement between said journal box and said gear ring.

10. In a vehicle, a car body, a generator, a supporting truck comprising a wheel and axle unit with an outer normally rotating axle and with an inner normally nonrotating axle having a journal end, a journal box supported on said journal end, and driving means for said generator comprising a gear ring secured to said outer axle and rotating therewith, a train of gears supported from said journal box and connected between said gear ring and said generator, said gear train comprising an independently housed gear shaft supported within said journal box beneath and parallel with said end, a gear shaft angularly disposed with respect to said first-mentioned shaft outwardly of said box, and means on said inner axle limiting relative lateral movement between said box and said gear ring.

11. In a vehicle, a supported member, a supporting truck having a wheel and axle assembly comprising a normally rotating wheel and a normally nonrotating journal end, a generator supported from said member, anti-friction means between said wheel and said end including a closure plate, a gear ring press-fitted on said closure plate, a gear train supported from said journal end with a gear wheel in mesh with said gear ring beneath said journal end, means connecting said gear train to said generator, said gear train comprising angularly disposed shafts, a flexible connection between one of said shafts and said generator, and means including a sleeve on said journal end limiting relative lateral motion between said gear wheel and said gear ring.

12. In a vehicle, a supported member, a supporting truck having a wheel and axle assembly comprising a normally rotating wheel and a normally non-rotating journal end, a generator supported from said member, antifriction means between said wheel and said end including a closure plate, a gear ring mounted on said closure plate, a gear train supported from said journal end with a gear wheel in mesh with said gear ring beneath said journal end, means connecting said gear train to said generator, said gear train comprising angularly disposed shafts, a universal connection between one of said shafts and said generator, and means including a sleeve on said journal end limiting relative lateral motion between said gear ring and said gear wheel.

13. In a railway vehicle, a car body, a supporting truck including a wheel and axle unit, a generator hung from said body, said unit comprising an outer normally rotating axle and an inner normally non-rotating axle, antifriction means between said axles including a closure plate, a journal box supported from said non-rotating axle, a gear ring fixed to said closure plate within said journal box, a train of gears supported from said journal box connecting said gear ring with said generator, and means for limiting relative lateral motion between said journal box and said gear ring and including a member sleeved over said non-rotating axle and fixed in said journal box.

14. In a vehicle, a car body, a generator, a supporting truck comprising a wheel and axle unit with an outer normally rotating axle and an inner normally non-rotating axle having journal ends, antifriction means between said axles including a closure plate, a journal box supported on one of said journal ends, and driving means for said generator comprising a gear ring supported from said closure plate for rotation with said outer axle, a train of gears supported from said journal box and connected between said gear ring and said generator, and means fixed on said last-mentioned journal end to limit relative lateral motion between said journal box and said gear ring.

15. In a vehicle, a supported body, a generator hung from said body, a supporting truck including an antifriction wheel and axle assembly with an outer normally rotating axle and an inner normally non-rotating axle having a journal end, bearings between said axles and a closure plate therefor, a journal box supported on said journal end, a gear ring mounted on said closure plate to rotate with said outer axle, a gear train supported from said journal end and connected between said generator and said gear ring, and means fixed on said journal end to limit relative motion between said gear ring and said journal box.

16. In a vehicle, a supported body, a supporting truck including an antifriction wheel and axle asssembly including a normally rotating wheel and a normally non-rotating axle with a journal end, a generator supported from said body, antifriction means between said wheel and said journal end including a cover plate, a gear wheel mounted on said cover plate to rotate with said wheel, drive means supported from said journal end and connected between said generator and said gear wheel, said drive means comprising angularly disposed gear shafts, one of said shafts being arranged below said journal end and having its axis parallel with the axis of said journal end, and means fixed on said journal end to limit relative laterial motion between said gear wheel and said last-mentioned shaft.

17. In a vehicle, a truck including a roller bearing wheel and axle assembly comprising a rotating outer axle, a wheel fixed thereon, a normally non-rotating inner axle having a journal end, roller bearings between said axles, a cover plate for said bearings supported by said outer axle, a gear wheel mounted on said cover plate, a drive shaft supported beneath and from said journal end on an axis parallel with the axis of said non-rotating axle and having a gear in mesh with said gear wheel, and means on said journal end limiting the relative lateral motion between said gear wheel and said parallel shaft.

18. In a vehicle, a car body, a generator supported thereon, a supporting wheel and axle assembly comprising a normally rotating axle, a wheel fixed thereon, a normally non-rotating axle having a journal end projecting outwardly of said wheel, bearings between said axles, a journal box supported on said journal end, a sleeve of bearing metal interposed between said box and said journal end, said journal box having a cavity below said journal end, a gear ring mounted to rotate with said outer axle, a drive shaft mounted in said cavity on an axis parallel with the axis of said journal end, said shaft having a gear wheel in mesh with said ring, a connection between said generator and said drive shaft, and means fixed on said journal end limiting the relative lateral motion between said gear wheel and said drive shaft.

19. In a railway vehicle, a car body, a generator supported thereon, a supporting roller bearing wheel and axle assembly comprising an outer rotating axle with wheels, an inner normally non-rotating axle having journal ends projecting beyond said wheels, bearings between said axles in bearing cavities, closure plates fixed on said outer axle, for the bearing cavities, a gear wheel mounted on one of said closure plates, a journal box supported on one of said journal ends and having an inboard cavity affording a housing for said gear wheel, a gear-train drive shaft enclosed in said journal box below the adjacent journal end, a pinion gear mounted on said shaft in mesh with said gear wheel, and a connection between said drive shaft and said generator.

20. In a railway vehicle, a roller bearing wheel and axle assembly comprising an outer axle with wheels fixed thereon, an inner axle having a journal end projecting outwardly of one of said wheels, roller bearings in bearing cavities between said axles, closure plates for said cavities, a gear ring mounted on one of said closure plates, a journal box mounted on said journal end with an inboard cavity housing said gear ring, and a drive shaft supported in said journal box and having a pinion gear in engagement with said gear ring.

21. In a railway vehicle, an antifriction wheel and axle assembly comprising an outer axle, a wheel fixed thereon, a normally non-rotating inner axle with a journal end projecting outboard said wheel, a roller bearing between said axles in a bearing cavity, a cover plate for the bearing cavity, a gear ring fixed on said cover plate, and a journal box supported on said journal end and having an inboard cavity affording a housing for said gear ring, and a drive shaft housed in said journal box with its axis parallel to the axis of said journal end and having a gear wheel enmeshed with said ring.

22. In a railway vehicle, an antifriction wheel and axle assembly comprising an outer axle, a wheel fixed thereon, a normally non-rotating inner axle with a journal end projecting outboard said wheel, a roller bearing between said axles in a bearing cavity, a cover plate for the bearing cavity, a gear ring fixed on said cover plate, a journal box supported on said journal end and having an inboard cavity affording a housing for said gear ring, and a drive shaft housed in said journal box below said journal end with a gear wheel enmeshed with said gear ring.

23. In a vehicle, an antifriction wheel and axle assembly comprising an outer axle, a wheel fixed thereon, an inner axle having a journal end outboard said wheel, a gear ring fixed to rotate with said outer axle, a journal box supported on said journal end, and means on said journal box affording an inboard cavity for said gear ring and a housing extending along said journal end for a drive shaft with a gear wheel enmeshed with said ring.

24. In a vehicle, an antifriction wheel and axle assembly comprising an outer axle, a wheel fixed thereon, an inner axle having a journal end outboard said wheel, a gear ring fixed to rotate with said outer axle, a journal box supported on said journal end, means on said journal box affording a housing for said gear ring, a drive shaft supported from said journal box below said journal end on an axis parallel with the axis of said journal end, and a gear wheel mounted on said drive shaft in mesh with said gear ring.

25. In a vehicle, an antifriction wheel and axle assembly comprising an outer axle, a wheel fixed thereon, an inner axle having a journal end outboard said wheel, a gear ring fixed to rotate with said outer axle, a journal box supported on said journal end, means on said journal box affording a housing for said gear ring, and a drive shaft including a gear wheel and having an independent housing so mounted in said journal box beneath said journal end as to permit its application and engagement with said gear ring without dismantling other parts.

26. In a railway vehicle, a roller bearing wheel and axle assembly comprising an outer axle, a wheel fixed thereon, an inner axle having a journal end projecting outboard said wheel, a gear ring fixed to rotate with said outer axle, a journal box supported on said journal end and supporting a housing for said gear ring, a drive shaft supported from said journal box and having a gear wheel in mesh with said gear ring, said drive shaft having an independent housing and said journal box having an inboard wall affording a tapered seat for said housing for accurate alignment of said drive shaft, and means fixed on said inner axle to limit the relative lateral motion between said gear ring and said journal box.

ALFRED H. OELKERS.